June 10, 1930.  E. G. GOODWIN  1,763,429
COUPLER KEY
Filed Sept. 18, 1925  2 Sheets-Sheet 1
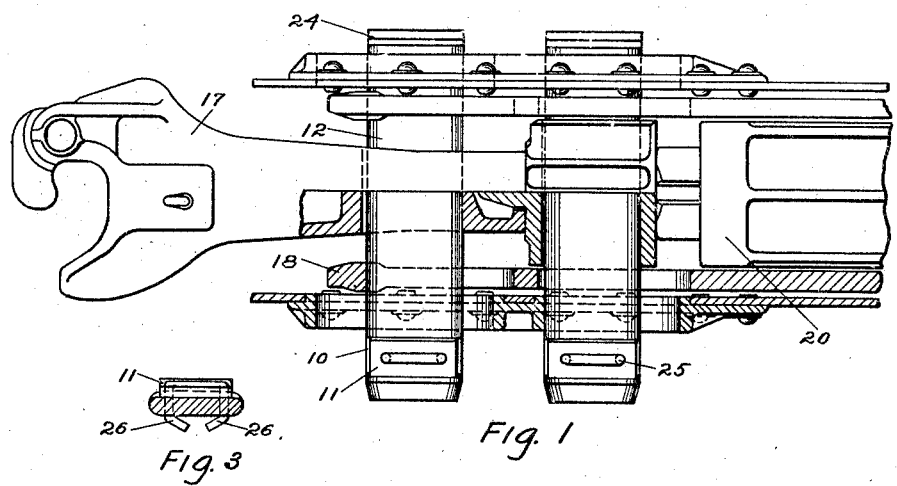
Fig. 1
Fig. 3
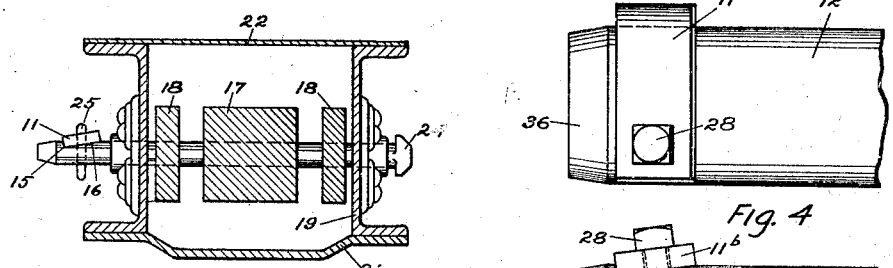
Fig. 2
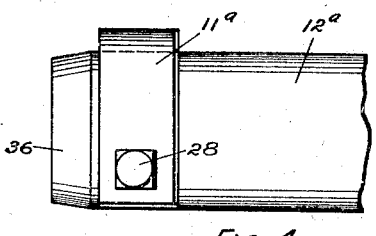
Fig. 4
Fig. 5
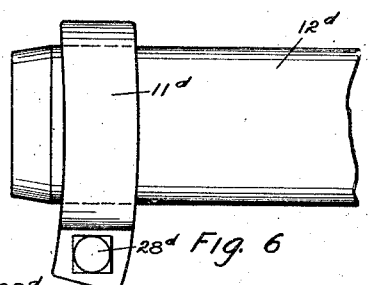
Fig. 6
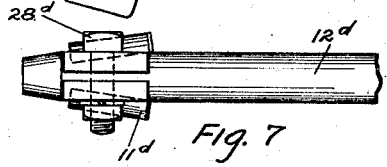
Fig. 7
INVENTOR.
ERNEST G. GOODWIN.
BY H. H. Snelling
ATTORNEY June 10, 1930.   E. G. GOODWIN   1,763,429
COUPLER KEY
Filed Sept. 18, 1925   2 Sheets-Sheet 2

INVENTOR.
ERNEST G. GOODWIN.
BY H. H. Snelling
ATTORNEY

Patented June 10, 1930

1,763,429

UNITED STATES PATENT OFFICE

ERNEST G. GOODWIN, OF PELHAM, NEW YORK, ASSIGNOR TO STANDARD COUPLER COMPANY, OF NEW YORK, N. Y., A CORPORATION OF NEW JERSEY

COUPLER KEY

Application filed September 18, 1925. Serial No. 57,080.

This invention relates to retaining means for slidable fasteners and has for its particular object the provision of a simple and efficient means for retaining in place a draft key.

A further object of the present invention lies in the provision of a flat draft key notched transversely on one of its wider faces, the base of the notch sloping with respect to the axis of the draft key so that the inserted key retaining member will transmit stress directly from the sill to the body of the key thereby obviating the danger of loss of a key by reason of the shearing of the usual cotter.

Up to the present time it has been the almost universal practice among manufacturers of railways equipment to retain coupler or draft keys by bending a piece of 5/8 inch stock into U-form and then inserting the legs of such U-member or bolt in spaced holes in the key, after which one or both of the extending ends or legs are bent over to prevent the bolt from working out. Altho not fully satisfactory this method of cottering draft keys has become general, probably because of relative cheapness and the ease with which a new cotter may be inserted when the old one becomes worn.

The wear on a cotter or U-bolt of this type may be and ordinarily is reduced by employing a washer. Cotters however, fail due to a cause totally distinct from wear, namely, the shear caused by the angling of the coupler when the coupler is in tension as for example, when a train is being drawn around a curve upgrade. Under such circumstances the friction between the draft key and the coupler itself becomes so great that when the coupler shifts to one side the friction tends to lock the key to the coupler and to draw the key thru the draft sills as far as the cotter or other retainer will permit. Naturally the use of a washer has absolutely no effect to relieve the cotter of this shear as the washer itself merely becomes the shearing element.

The present invention resides more particularly in the thought of notching the key in such a manner or fashion as to offer no hindrance to its application nor to reduce its strength along such portion where the draft loads are applied and to fasten in such notch a filler so that one edge of the filler at time of tendency to shear will bear against the outer shoulder of the key while the other edge is against the side of the cheek plate or draft sill, this giving a close approximation of the adding of a second head to the key and practically eliminating all shear action.

In the drawings:—

Figure 1 is a view partly in longitudinal section thru a draft rigging showing two keys each having applied thereto a retainer embodying the present invention.

Figure 2 is a transverse vertical section thru the draft sills and saddle plate showing one of the keys in elevation.

Figure 3 is a vertical section thru a key showing the retainer in elevation.

Figures 4 and 5 show a modification in which the filler is U-shaped and is secured in place by a bolt passing thru the two ends of the filler and thru the key.

Figures 6 and 7 show a further modification in which the filler is curved to keep the ends from contacting with the sills when the key is at an angle to the transverse center line of the car, the key in this modification having no bolt receiving hole therethru.

Figure 8:
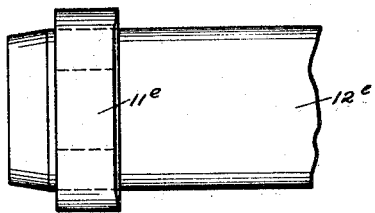
Figure 9:
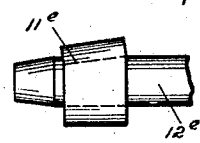
Figure 10:
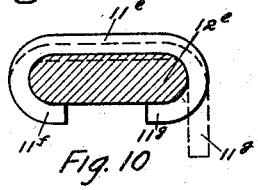

Figures 8, 9, and 10 show a still further modification in which the filler is curved around the sides of the key.

Figure 11:
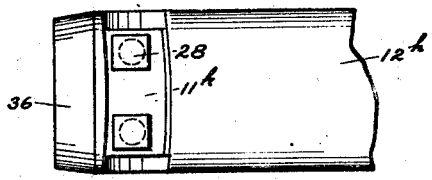
Figure 12:
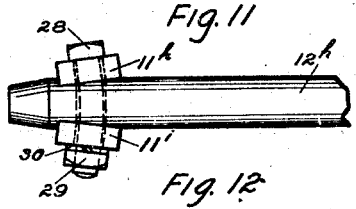

Figures 11 and 12 show a modification in which the top and bottom filler blocks are secured together by a plurality of bolts.

Figure 13:
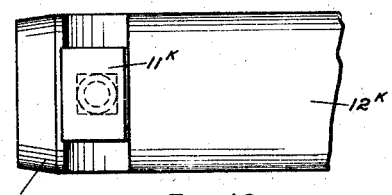
Figure 14:
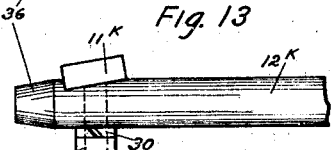

Figures 13 and 14 show the filler piece as being the head of a T-bolt.

Figure 15:
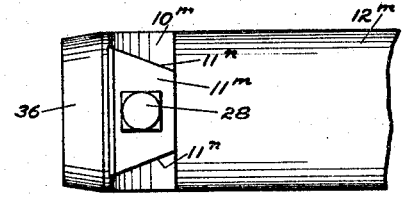
Figure 16:
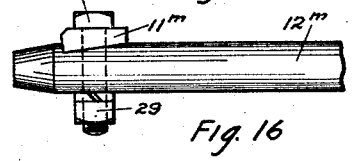

Figures 15 and 16 show a modified form of filler.

Figure 17:
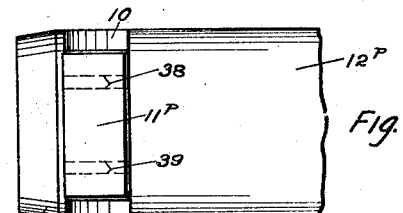
Figure 18:
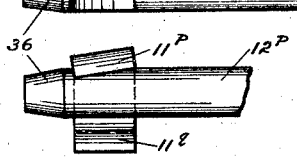
Figure 19:
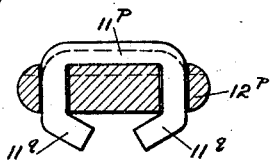

Figures 17, 18, and 19 show the filler as formed of a flat U bolt passing thru the slots in the key.

Figure 20:
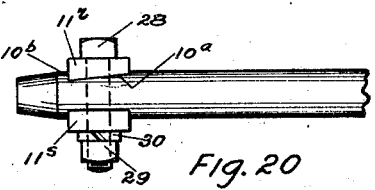

Figure 20 shows the notch in the key as having its outer wall perpendicular to the axis of the key.

In the simple form shown in Figures 1, 2, and 3, the filler 11 is a simple rectangular block seated in a tilted manner in a V-shaped transverse notch 10 of the key 12, the outer wall 15 of the transverse notch being relatively steep while the other wall 16 of the notch which forms the floor thereto slopes at a slight angle, the dihedral angle between the two sides of the notch preferably tho not necessarily being a right angle. In these figures the conventional parts of a coupling device are shown including the coupler 17, yoke 18, sills 19, spring barrel 20, saddle or carry plate 21, top plate 22, and the keys are shown as having the usual heads 24.

As illustrated the rigging uses two keys but obviously the invention is not so limited and in fact pertains to any slidable fastener retaining means. The fillers 11 should be held in position by some preferably removable means and for this purpose I may employ the usual U-bolt 25 bent from a piece of cylindrical stock and with the ends bent over after assembly as at 26 to prevent the inclined fillers from climbing up when drawn into contact with the draft sills.

In the form shown in Figures 4 and 5 the key $12^a$ is notched at both top and bottom and the filler $11^a$ is bent to U-shape, the two ends $11^b$ and $11^c$ terminating substantially in line with one of the side edges or narrow faces of the key, the filler member $11^a$ being held in place by a bolt 28 having the usual nut 29 and nut lock 30. As will be noted the bolt is preferably bent so as to be normal to each end of the filler $11^a$.

In Figures 6 and 7 the key $12^d$ has two notches substantially as before except that the notches are slightly curved so that the filler $11^d$ may itself be curved in order to clear the draft sill or car framing when the key, which is always at right angles to the coupler, is turned to an appreciable angle with the transverse center line of the car. In this modification the bolt $28^d$ is positioned to one side of the key and the key therefore has no opening of any kind therethru. This form of the invention is appreciably more expensive than the other forms shown but it has quite decided advantages.

The simple and inexpensive design shown in Figures 8, 9, and 10 also requires no hole thru the key $12^e$ which has a transverse notch on the top face only which notch however, may extend slightly over on the rounded sides. The filler $11^e$ is a single piece of material preferably with a preformed hooked end $11^f$. The filler is slipped into position and then the free end $11^g$ is bent from the position shown in dotted lines to the position shown in full lines, the two ends when the filler or retainer is in place, facing each other.

The filler block $11^h$ in the modification shown in Figures 11 and 12 is exactly the same as in Figure 1 but in this form there is a second filler $11^i$ exactly similar to the filler 11 but located on the bottom wide face. The bolt 28 with its nut 29 and nut lock 30 passes thru both of the fillers and thru the key $12^h$ itself.

In Figures 13 and 14 the key $12^k$ has a single notch as in Figure 1 but in this case the filler $11^k$ is the head of a bolt, the stem of which is indicated at $28^k$. It will be noted that the head is not normal to the stem as I much prefer that the long wall or floor of the notch shall slope downwardly toward the axis in the direction of the tapered end 36 of the key, this in order that the stress caused by the driving of the key toward the sill by friction between the key and coupler will be resisted by the solid block of metal of the filler so that the stress is transmitted from the sill directly to the body of the key, practically eliminating all possibility of shear as the shear stress line is thru the entire filler and thru a section of the key substantially the same in area.

In Figures 15 and 16 the filler $11^m$ is a trapezoid in plan, the corners $11^n$ being cut away to clear the sill as previously described. In this form the filler itself is tapered, the bottom face seating in the sloping floor of the notch $10^m$ in the key $12^m$ while the top face $11^o$ is parallel with the axis of the key.

The design of draft key retainer shown in Figures 17, 18, and 19, is especially attractive in that it is very economical and is a thoroughly practical device. In this form which at present is the preferred type of the invention as far as the invention relates to draft keys, the key $12^p$ has the usual transverse notch 10, the floor slopping from the upper flat face of the key down to a point short of where the taper of the key begins and the other wall of the notch is quite steep making an angle of 90° with the wall of the notch. The key itself is slotted in two places indicated at 38 and 39, these slots being parallel, longitudinally disposed, and of such size as to receive the legs of a filler $11^p$ of the same width as the notch; in other words the filler is preferably at least twice as wide as it is thick. The filler $11^p$ is first bent into U-shape and the legs $11^q$ of the U are then placed within the slots 38 and 39 after which the ends of the filler 11ᵖ are bent over as shown in Figure 19, serving to keep the filler permanently in place.

Figure 20 shows a slight modification suitable for use with any of the other types, the difference being that the sloping notch 10ᵃ has its shorter wall 10ᵇ normal to the key axis, and the notch 10ᶜ at the bottom of the key is shown as having three sides, the floor being parallel to the major axis of the cross section and to the axis of the key and both of the short walls being at right angles to the floor of the notch. In this figure the upper filler block 11ʳ is substantially the same in cross section as the filler block 11ᵐ of Figure 16 and the lower filler block 11ˢ may be of any of the styles of single filler faces shown.

What I claim is:—

1. A draft key having near one end two spaced holes, and having a transverse notch between said holes, the wall of the notch nearest the end of the key being relatively steep with respect to the longitudinal axis of the key.

2. A headed draft key having near the headless end two spaced holes, and having a transverse V-shaped notch between said holes, the wall of the notch nearest the headless end of the key being steep, the other wall of the notch sloping inward from the margin of the holes nearest the headed end.

3. A draft key of elongated flat type having a notch formed in one of the wide faces adjacent one end of the key, said notch being of greater length than half the width of the key and one wall of the notch being steeper with respect to the longitudinal axis of the key than is the other, said notch being adapted to receive a key retainer.

4. A draft key having at least one headless end and near same two spaced holes, and having a transverse V-shaped notch between said holes, the wall of the notch nearest the proximate end of the key being steep, the other wall of the notch which forms the floor of the notch, sloping gently upward from the steep wall of the notch.

5. A draft key transversely notched near one end, the bottom face of the notch sloping with respect to the longitudinal centerline of the key so that when a member is placed in the notch to transmit shear from the sill to the body of the key it will be tilted down toward the near end of the key, the outer wall of said notch being curved about a center outside of the key, whereby when the sill engaging face of the shear transmitting member is similarly curved it will remain tangent to the sill during angling of the draft gear.

6. An elongated flat draft key having at least one headless end and having near a headless end two spaced holes and having on each of its two wide faces a notch, one wall of each notch being relatively steep with respect to the longitudinal axis and the other wall of each notch sloping gently from the longitudinal axis as it progresses from the steep wall toward the far end of the key.

7. The device of claim 6 in combination with retaining means engaging both notches so as to transmit shear from the sill toward the axis of the key.

In testimony whereof I affix my signature.

ERNEST G. GOODWIN.